W. H. EDMUNDS.
SPRING SUSPENSION FOR VEHICLES.
APPLICATION FILED MAR. 25, 1914.
1,263,388.
Patented Apr. 23, 1918.
2 SHEETS—SHEET 1.
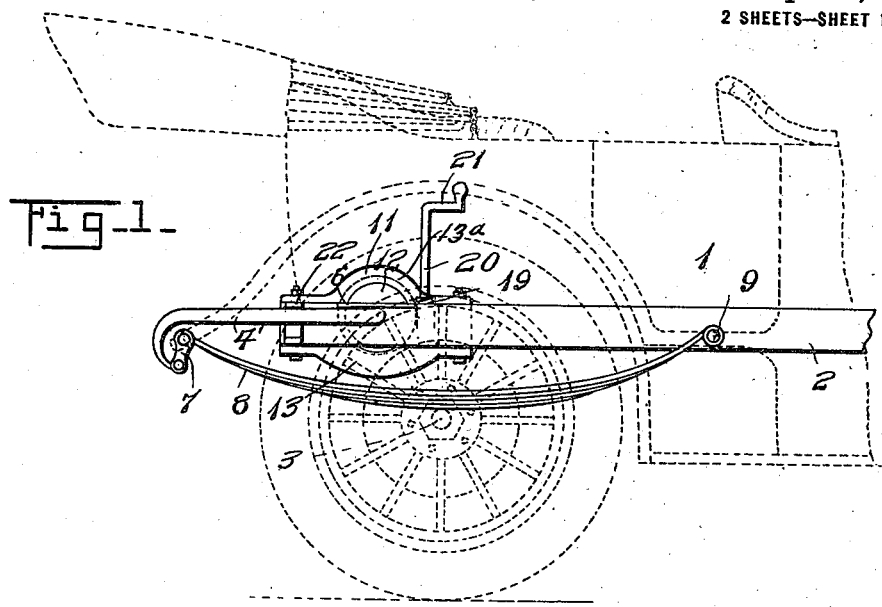
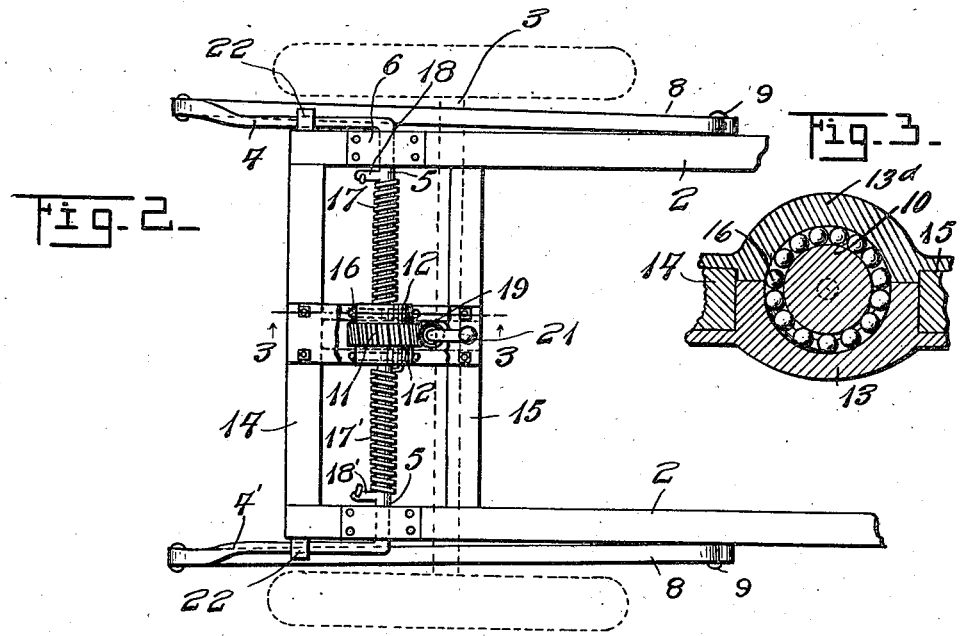
Inventor
W. H. Edmunds W. H. EDMUNDS.
SPRING SUSPENSION FOR VEHICLES.
APPLICATION FILED MAR. 25, 1914.
1,263,388.
Patented Apr. 23, 1918.
2 SHEETS—SHEET 2.
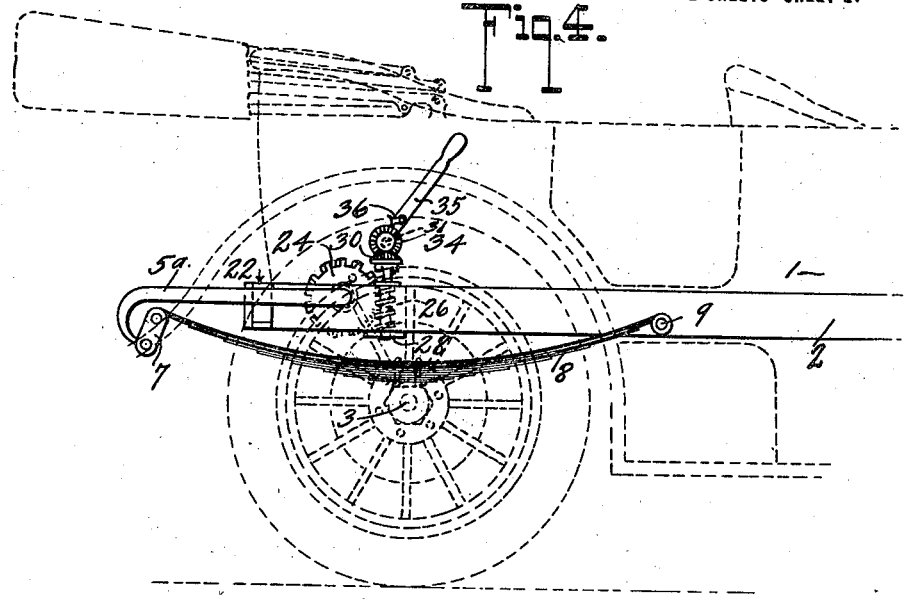
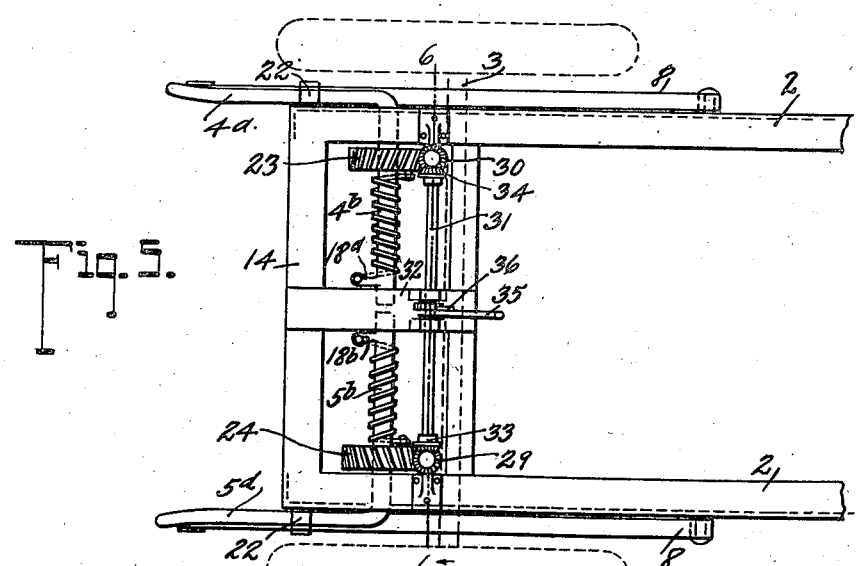
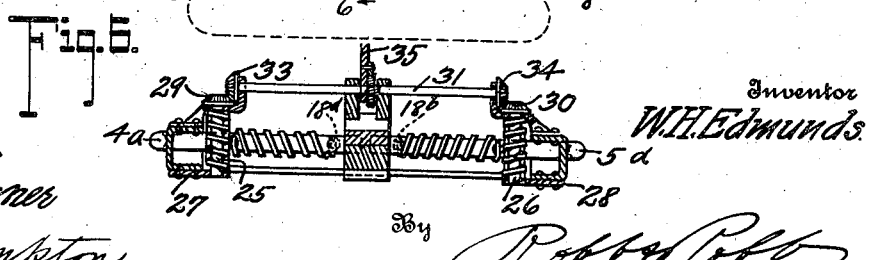

UNITED STATES PATENT OFFICE.

WILLIAM HOVEY EDMUNDS, OF LEESBURG, VIRGINIA.

SPRING SUSPENSION FOR VEHICLES.

1,263,388.   Specification of Letters Patent.   Patented Apr. 23, 1918.

Application filed March 25, 1914. Serial No. 827,191.

*To all whom it may concern:*

Be it known that I, WILLIAM HOVEY EDMUNDS, a citizen of the United States, residing at Leesburg, in the county of Loudoun and State of Virginia, have invented certain new and useful Improvements in Spring Suspensions for Vehicles, of which the following is a specification.

The present invention appertains to improvements in spring suspension for vehicles, the novel and characteristic feature of which is the provision of adjusting means whereby the resiliency or spring resistance of the same may be regulated according to the extent of the load carried thereby.

It is undoubtedly recognized at this date that vehicles in general, and motor vehicles in particular, must be provided with a spring suspension which will serve the purpose of absorbing shocks of the road when the maximum weight is carried by said vehicle and to accomplish which the springs are necessarily made extremely strong so as to carry smoothly said maximum weight imposed upon them, but the great disadvantage in such constructions is that under a light load these springs perform very little resilient function, causing hard riding motion incident to the transfer of the vibrations and shocks to the vehicle body and contents.

Now what I particularly aim to accomplish by my invention, is a resiliency of action of the suspension which may be easily and quickly adjusted so that with either a maximum or minimum weight, and variations therebetween, all shocks may readily be compensated for.

More specifically, my invention contemplates the employment of a supporting member intermediate the axle and the vehicle frame and tensioning means for placing said supporting member under tension, and means readily accessible from the vehicle body for adjusting the tensioning means to equalize the torsional resistance of said tensioning means at each side of the vehicle body, whereby to increase or decrease the spring resistance according to the weight carried by the vehicle or to compensate for loss of life of the springs from constant use.

With the above and other objects in view, this invention consists in the construction, combination and arrangement of parts all as hereinafter more fully described, claimed and illustrated in the accompanying drawings, wherein:—

Figure 1 is a fragmentary view of a motor vehicle showing the adaptation of my invention thereto.

Fig. 2 is a plan view of the device, a portion of the bearing casing being broken away to show interior details.

Fig. 3 is a sectional view on the line 3—3 of Fig. 2.

Fig. 4 is a view similar to Fig. 1, but disclosing a modified construction of the invention.

Fig. 5 is a plan view of the same; and

Fig. 6 is a transverse sectional view taken about on the line 6—6 of Fig. 5.

Throughout the following detail description, and on the several figures of the drawings, similar parts are referred to by like reference characters.

It will be apparent as this description proceeds that the suspension means comprehended thereby may readily be adapted to any style of vehicle, but as illustrated in the drawings I have shown such means arranged upon a motor vehicle, such vehicle being indicated by dotted lines in order to bring out more clearly the details of construction of the device. The numeral 1 indicates the vehicle body, 2 the side frame members therefor and 3 the rear axle of the running gear. At a suitable point near the rear extremities of the side members 2 of the vehicle frame is journaled at each side a supporting member, in the form of a bar which comprises the longitudinally extending side arm 4 and a transverse portion 5, secured to its respective side bar 2 by means of the journal cap 6, the transverse portion 5 of the bar being bent at substantially right angles to the lever arm 4 just mentioned. The outer or rear extremity of the side arm 4 is bent downwardly as shown most clearly in Fig. 1 and secured to the shackle 7 carried by the rear extremity of a semi-elliptical spring 8 connected to the rear axle of the vehicle in the usual manner and also secured to the vehicle frame or body at its forward extremity as indicated at 9. The inner end of the transverse portion 5 of the supporting bar or member is journaled in a rotatable member 10 which member comprises a worm gear 11 and laterally projecting bearing drums 12 extending from each side of the same, the rotatable member 10 being supported in a bearing 13, shown most clearly in Fig. 3, which extends longitudinally of the vehicle frame and is secured to the spaced transverse frame members 14, 15. The bearing 13 has a removable cap 13ª providing a complete housing for the parts and prevents access of dust thereto as well as enabling the use of lubricant for the same. The bearing drums 12 are preferably of a smaller diameter than the worm gear 11 and each is provided with roller bearings 16 to facilitate rotation of the member 10 in an obvious manner. As inferred hereinbefore, a second supporting member exactly like that described (4, 5) is disposed at the opposite side of the vehicle, and comprises the lever arm 4', and the transverse portion 5' extending into the rotatable member 10 as shown clearly in Fig. 2 of the drawing.

Mounted upon, or surrounding the respective transverse portions 5 and 5' of each supporting member are torsion springs 17 and 17', one end, the inner, of each torsion spring being secured to the member 10 which is disposed intermediate said springs while the opposite end is connected to a short lever arm 18, 18' formed integral with the respective transverse portions 5 and 5' of each supporting member.

As will be obvious, tension of the separate springs 17 and 17' will be imparted to the respective lever arms 4 and 4' and the vehicle suspended in this manner. It is particularly advantageous to employ the semi-elliptical spring 8 in conjunction with the respective supporting members though it is comprehended by my invention that the supporting members may be secured to the axle in any other suitable manner so as to suspend the vehicle body upon the said axle and afford the usual resilient action.

Intermeshing with the worm gear 11 is a worm 19 on the vertically disposed operating rod 20 terminating at its upper extremity in a crank 21, this operating rod as shown in Fig. 1 being arranged at a convenient point at the rear portion of the vehicle where it may be suitably housed beneath the rear seat or other convenient point of access.

It will be apparent from the foregoing description that rotation of the operating rod 20 by means of the crank 21 will cause the increase or decrease of the tension of each spring 17 and 17' due to rotation of the member 10 and such depending of course upon the direction in which the operating member 20 is turned. By means of this adjusting mechanism consisting of the rotatable member 10, the worm 19 and the operating rod 20, a wide range of adjustment may be procured and the springs 17 and 17' may thereby be provided with an increased or decreased number of convolutions, all depending upon the weight which is to be carried by the vehicle. When the weight is considerable, or maximum, by operation of the adjusting means the torsion of the springs may be greatly increased so as to bear the weight imposed upon the body and cause easy riding of the vehicle. Such torsional resistance not being desirable when the vehicle is lightly loaded or without load, operation of said adjusting means to decrease the tension is readily accomplished in a manner hereinbefore described, and the particularly advantageous feature of the adjusting means is that the adjustment is performed at each side of the vehicle simultaneously, insuring a proper equalization of the tension upon the torsion springs 17 and 17'. Of course it would be possible to obtain an independent adjustment of these springs by individual manipulation of the extremities which coöperate with the short lever arms 18 and 18' but this under ordinary conditions would not be necessary.

I preferably employ abutments 22 located at each side of the vehicle frame, and disposed upon the side members 2 thereof which are adapted to coöperate with the side arms 4 and 4' of the supporting members so as to limit their movement and necessarily the rebounding of the vehicle body under abnormal conditions.

The arrangement hereinbefore described is employed where space available for the structure is sufficient but it will be clearly apparent that where necessary or desirable a different arrangement may be employed and embodying instead of the single worm gear and worm for adjusting the tension, two worm gears and worms mounted freely upon their respective shafts after a manner illustrated in Figs. 4 5 and 6 of the drawings. In this modification of my invention I provide supporting members 4ª, 5ª connected to the vehicle axle and the frame exactly as described with respect to the preferred form. The transverse portions 4ᵇ, and 5ᵇ of the supporting members, however, have freely mounted thereupon adjacent their bearing on the frame, worm gears 23 and 24 respectively. The torsion springs 17, 17' are connected at one end to the worm gears and at their opposite end to short lever arms 18a, 18b somewhat similar to the arrangement shown in Fig. 2 of the drawing. Intermeshing with each worm gear 23, 24 is a coöperating worm 25, 26 suitably supported in brackets 27, 28 on the side members 2 of the vehicle frame and connected to the worm shafts at their upper extremities are beveled pinions 29, 30. A transverse shaft 31 suitably supported on the vehicle frame in a central bearing 32 carries at its opposite extremities beveled pinions 33, 34 intermeshing with the pinions 29 and 30 respectively. An operating lever 35 is connected to the shaft 31 through a reversible ratchet 36 and movement of this lever backwardly and forwardly will cause the shaft 31 to rotate and transmit motion through the worms 25, 26 to the worm gears 23 and 24, the rotation of which latter gears increases or decreases the tension of the torsion springs 17, 17′ according to which direction the shaft 31 is rotated. The reversible ratchet 36 enables this adjustment to be made in a manner to either increase or decrease the tension as just described and the modification of my invention accomplishes the same result of simultaneous adjustment of the supporting members for the vehicle hereinbefore clearly set forth.

Having thus described my invention, what I claim as new is:

1. In a spring suspension for automobiles, the combination with a frame and axle, of a movable supporting member for said frame operatively connected to the axle, said member having portions thereof arranged contiguous to and in the plane of the frame for coöperation therewith to provide a laterally rigid support whereby to prevent relative sidewise movement, and resilient means coacting with the supporting member for resiliently sustaining the frame aforesaid.

2. In a spring suspension for automobiles, the combination with a frame and axle, of a supporting member journaled on said frame and operatively connected to the axle, said member having arm extensions arranged at opposite sides of the frame in the same horizontal plane with respect thereto, said arms coacting with the sides of the frame to prevent relative sidewise movement, resilient means carried by said supporting member for resiliently sustaining the frame on the axle, and means for adjusting said resilient means to increase or decrease the resiliency.

3. In a vehicle suspension for automobiles, the combination with a frame, an axle and main springs therefor, of supporting arms each pivotally connected to the frame at one end and to a main spring at the other end, said arms being vertically movable at opposite sides of the frame, the sides of said frame coacting therewith to prevent lateral relative movement, and adjustable means for imparting tension to said arms whereby to resiliently sustain the frame.

4. In a spring suspension for automobiles, the combination with a frame, axle, and main springs therefor, of a supporting member arranged transversely of the frame and journaled in spaced relation to the end of said frame, said supporting member having angularly bent arms disposed to coact with the outer sides of the frame and pivotally connected to the main springs aforesaid, tension means carried by said supporting member for resiliently supporting the frame, and revoluble means for adjusting the tension means to regulate the suspension according to the load on the frame.

5. In a spring suspension for automobiles, the combination with a frame, axle, and main springs therefor, of a supporting member arranged transversely of the frame and journaled in spaced relation to the end of said frame, said supporting member having angularly bent arms disposed to coact with the outer sides of the frame and pivotally connected to the main springs aforesaid, spaced stop members projecting laterally from the sides of the frame between which the respective arms aforesaid are disposed so as to maintain said arms in coöperative relation with respect to the frame and thereby prevent lateral movement of the latter, and tension means carried by said supporting member for resiliently supporting the frame.

6. In a spring suspension for vehicles, the combination with a frame or body and axle therefor, of a supporting member disposed at each side of the vehicle, each supporting member having a longitudinally extending lever arm connected to the axle and a transverse arm journaled at one end upon the vehicle frame, a torsion spring disposed upon the transverse portion aforesaid of each arm, means for winding the torsion spring about said arm and disposed intermediate said springs, said transverse portions of the supporting members being journaled in said winding means, a bearing carried by the vehicle frame in which said winding means is mounted, and an operating member for rotating said winding means whereby to adjust the torsional resistance at each side of the vehicle equally.

7. In a spring suspension for vehicles, the combination with a frame or body and axle therefor, of a supporting member disposed at each side of the vehicle, each supporting member having a longitudinally extending lever arm connected to the axle and a transverse arm journaled at one end upon the vehicle frame, a torsion spring disposed upon the transverse portion aforesaid of each arm, a rotatable member disposed intermediate the springs and in which the inner extremities of the transverse portions of the supporting members are journaled, said rotatable member comprising a worm gear and bearing extensions formed at each side of said gear, a bearing in which said rotatable member is journaled, an operating rod disposed adjacent the rotatable member and having a worm intermeshing with the worm gear aforesaid, and a crank for rotating the operating rod to adjust the tension of the torsion springs.

In testimony whereof I affix my signature in presence of two witnesses.

WILLIAM HOVEY EDMUNDS.

Witnesses:
    ALBERT BLUME, Jr.,
    ROBT. A. MEYER.